US011779786B2

(12) United States Patent
Yang

(10) Patent No.: US 11,779,786 B2
(45) Date of Patent: Oct. 10, 2023

(54) APPARATUS FOR SUPPLYING FIRE EXTINGUISHING AGENT TO HIGH VOLTAGE BATTERY OF VEHICLE

(71) Applicants: Hyundai Motor Company, Seoul (KR); Kia Motors Corporation, Seoul (KR)

(72) Inventor: Huitae Yang, Hwaseong-si (KR)

(73) Assignees: Hyundai Motor Company, Seoul (KR); Kia Motors Corporation, Seoul (KR)

(\*) Notice: Subject to any disclaimer, the term of this patent is extended or adjusted under 35 U.S.C. 154(b) by 457 days.

(21) Appl. No.: 17/068,027

(22) Filed: Oct. 12, 2020

(65) Prior Publication Data

US 2021/0387031 A1    Dec. 16, 2021

(30) Foreign Application Priority Data

Jun. 11, 2020  (KR) .................. 10-2020-0070755

(51) Int. Cl.
*A62C 3/07* (2006.01)
*A62C 35/10* (2006.01)
*A62C 3/16* (2006.01)

(52) U.S. Cl.
CPC .................. *A62C 3/07* (2013.01); *A62C 3/16* (2013.01); *A62C 35/10* (2013.01)

(58) Field of Classification Search
CPC ....... A62C 3/07; A62C 35/10; A62C 99/0063; A62C 99/0018; A62C 35/023; A62C 2/04; A62C 3/16; H01M 50/143; B60L 58/24; B60L 58/26; B60L 3/0046; B60L 3/00; B60K 11/00; B60K 11/02; B60K 1/04

USPC .......................................................... 169/11
See application file for complete search history.

(56) References Cited

U.S. PATENT DOCUMENTS

| 2011/0083864 A1* | 4/2011 | Smith ..................... A62C 37/48 169/56 |
| 2012/0244399 A1* | 9/2012 | Tartaglia ............. H01M 50/262 429/82 |
| 2016/0059056 A1* | 3/2016 | Hoffman, III ......... A62C 3/002 169/58 |
| 2019/0351268 A1* | 11/2019 | Lee ..................... H01M 10/486 |

FOREIGN PATENT DOCUMENTS

WO    WO2015075679 A1 *  5/2015  ............... A62C 3/07

\* cited by examiner

*Primary Examiner* — Christopher R Dandridge
*Assistant Examiner* — Juan C Barrera
(74) *Attorney, Agent, or Firm* — MORGAN, LEWIS & BOCKIUS LLP

(57) ABSTRACT

An apparatus of supplying a fire extinguishing agent to a high voltage battery pack of a vehicle when a fire occurs in a battery case installing a high voltage battery pack includes a fire detection device that is configured to detect an occurrence of the fire in the battery pack, an inflow plug which is formed at the battery case and is configured to allow the fire extinguishing agent to flow into the battery case when open, a fire extinguishing agent supply pipe connected to the inflow plug and guiding the fire extinguishing agent to the inflow plug, and an inflow plug opening device that is configured to open the inflow plug when the fire is detected in the fire detection device.

16 Claims, 3 Drawing Sheets

APPARATUS FOR SUPPLYING FIRE EXTINGUISHING AGENT TO HIGH VOLTAGE BATTERY OF VEHICLE

CROSS-REFERENCE TO RELATED APPLICATION

The present application claims priority to Korean Patent Application No. 10-2020-0070755 filed on Jun. 11, 2020, the entire contents of which is incorporated herein for all purposes by this reference.

BACKGROUND OF THE INVENTION

Field of the Invention

The present invention relates to an apparatus of supplying a fire extinguishing agent to a high voltage battery of a vehicle.

Description of Related Art

In general, a vehicle using a motor as a power source (e.g., a battery electric vehicle, a hybrid electric vehicle, etc.) is provided with a high voltage battery. The high voltage battery of such a vehicle is usually mounted outside the vehicle body (e.g., under a vehicle body).

When a fire occurs in the high voltage battery although not frequent cases, such a fire in the high voltage battery is very difficult to suppress, and early suppression of the fire in the high voltage battery is beneficial to safety.

A fire while driving of a vehicle is usually occurs in an open space, and in the instant case, the vehicle may merely be burned even if the suppression of the fire is delayed. However, a vehicle is often parked in a closed space, such as an underground parking lot. In the instant case, when a battery fire occurs, toxic gases and smoke are generated until the vehicle is fully burned out, which may contaminate the entire closed space such as an underground parking lot. Therefore, the demand for early suppression of a fire of a high voltage battery becomes more important in the case of a fire when parked.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus of supplying a fire extinguishing agent to a high voltage battery pack of a vehicle when a fire occurs in a battery case installing a high voltage battery pack, which may include a fire detection device that is configured to detect an occurrence of the fire in the battery pack, an inflow plug which is formed at the battery case and is configured to allow the fire extinguishing agent to flow into the battery case when the inflow plug is opened, a fire extinguishing agent supply pipe connected to the inflow plug and guiding the fire extinguishing agent to the inflow plug, and an inflow plug opening device that is configured to open the inflow plug when the fire is detected in the fire detection device.

The fire detection device may heat a pressure transfer gas by a high temperature gas which is discharged when a fire occurs in the battery pack, and the inflow plug opening device may open the inflow plug by use of a pressure of the pressure transfer gas supplied from the fire detection device.

The fire detection device may include a gas discharge plug which is opened by a pressure of a high temperature gas generated in the battery pack to discharge the high temperature gas from the battery case when the fire occurs in the battery pack, a high temperature gas discharge pipe in which the gas discharge plug is mounted to discharge the high temperature gas discharged through the gas discharge plug, and a high temperature gas detection device which is activated by the high temperature gas flowing through the high temperature gas discharge pipe.

The high temperature gas detection device may include a pressure transfer gas storage mounted on the high temperature gas discharge pipe, storing the pressure transfer gas, and heated by the high temperature gas flowing through the high temperature gas discharge pipe, a pressure transfer pipe connecting the pressure transfer gas storage and the inflow plug opening device; a pressure transfer pipe valve mounted on the pressure transfer pipe to selectively transfer pressure through the pressure transfer pipe, and a controller electrically connected to the pressure transfer pipe valve and configured to open or close the pressure transfer pipe valve depending on whether the vehicle runs.

The controller may be configured to control the pressure transfer pipe valve to open when the vehicle is not running.

The controller may be configured to control the pressure transfer pipe valve to close when the vehicle is running.

Whether the vehicle is running may be determined based on a vehicle speed.

Whether the vehicle is running may be determined based on a discharge rate of the high voltage battery pack of the vehicle.

The inflow plug opening device may include a bellows tube which is formed between the inflow plug and the battery case, connected to the high temperature gas detection device, and configured to expand when the high temperature gas detection device is activated.

The inflow plug opening device may include a bellows tube which is formed between the inflow plug and the battery case, connected to the pressure transfer pipe, and expands by an internal pressure of the pressure transfer pipe.

The inflow plug opening device may further include an elastic spring that forms a pressurizing force on the inflow plug from an opposite side to the bellows tube.

An end portion of the fire extinguishing agent supply pipe opposite to the battery case may be connected to a rain gutter formed under a windshield of the vehicle.

The pressure transfer gas may be an inert gas which is inactive to chemical reaction.

The pressure transfer gas may be Argon (Ar).

According to an apparatus of supplying a fire extinguishing agent to a high voltage battery of a vehicle according to various exemplary embodiments of the present invention, when the high voltage battery fires during parking, the fire extinguishing agent supplied from the outside thereof may be smoothly supplied into the high voltage battery, facilitating early suppression of the fire.

Other effects which may be obtained or are predicted by an exemplary embodiment will be explicitly or implicitly described in a detailed description of the present invention. That is, various effects that are predicted according to an exemplary embodiment will be described in the following detailed description.

The methods and apparatuses of the present invention have other features and advantages which will be apparent

Figure 1:
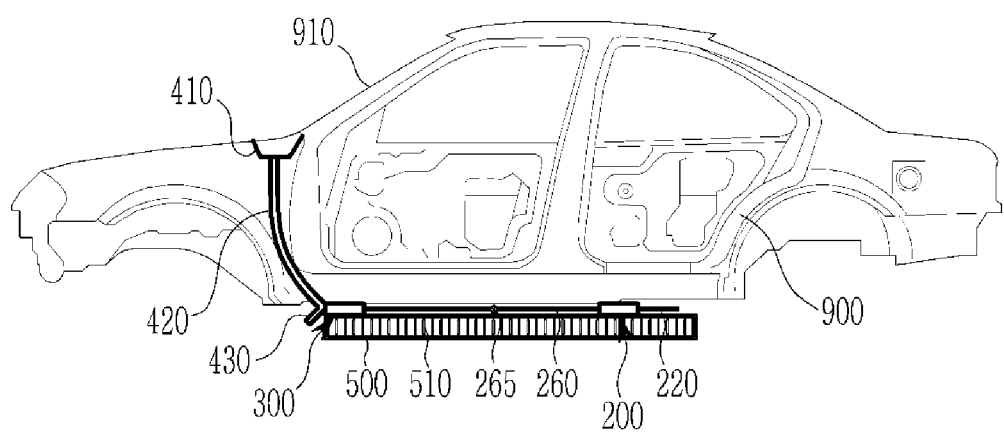
FIG. 1 schematically illustrates an apparatus of supplying a fire extinguishing agent to a high voltage battery of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, various exemplary embodiments is representatively described, and in other exemplary embodiments of the present invention, only different configurations from the various exemplary embodiments will be described.

To clarify the present invention, parts that are not related to the description will be omitted, and the same elements or equivalents are referred to with the same reference numerals throughout the specification.

Furthermore, unless explicitly described to the contrary, the, the word "comprise" and variations such as "comprises" or "comprising", will be understood to imply the inclusion of stated elements but not the exclusion of any other elements.

Throughout the present specification and the claims that follow, when it is described that an element is "coupled" to another element, the element may be "directly coupled" to the other element or "electrically coupled" to the other element through a third element. Furthermore, unless explicitly described to the contrary, the word "comprise", and variations such as "includes" or "including", will be understood to imply the inclusion of stated elements but not the exclusion of any other elements.

In the following description, dividing names of components into first, second, and the like is to divide the names because the names of the components are the same as each other, and an order thereof is not particularly limited.

FIG. 1 schematically illustrates an apparatus of supplying a fire extinguishing agent to a high voltage battery of a vehicle according to various exemplary embodiments of the present invention.

Figure 2:
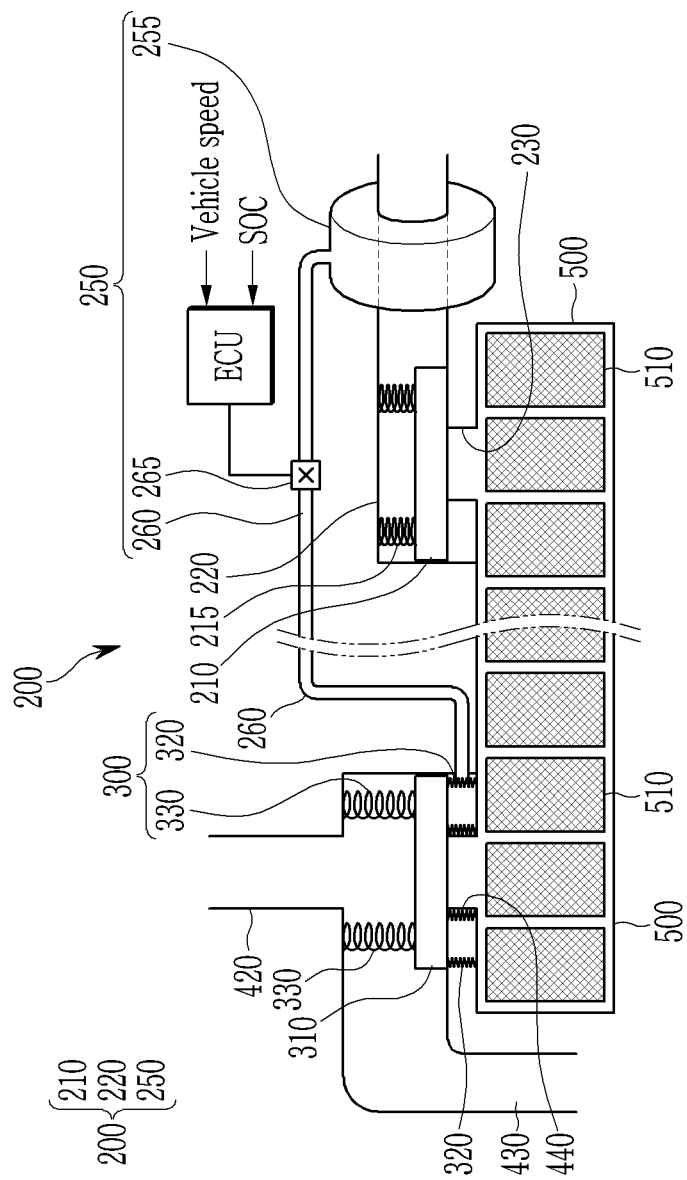
FIG. 2 is a schematic diagram of an apparatus of supplying a fire extinguishing agent to a high voltage battery of a vehicle according to various exemplary embodiments of the present invention.

FIG. 2 is a schematic diagram of an apparatus of supplying a fire extinguishing agent to a high voltage battery of a vehicle according to various exemplary embodiments of the present invention.

As shown in FIG. 1 and FIG. 2, an apparatus according to various exemplary embodiments of the present invention is an apparatus of supplying a fire extinguishing agent to a high voltage battery of a vehicle, when a fire occurs in a battery case mounted on an outside of a vehicle body of the vehicle and installing the high voltage battery pack.

Here, the fire extinguishing agent may be any fire extinguishing agent (e.g., water or dry or wet chemicals) which is sprayed by a firefighter toward the vehicle from outside during a fire, and may be any medium which may be supplied inside the battery case 500 through a line to suppress the fire in the battery case 500.

In the drawing, the battery case 500 is shown as having a cross-section in a rectangular shape (e.g., cuboid in three dimensions) for illustrative purposes, but the present invention is not limited thereto. It may be understood that a specific shape of the battery case 500 may vary depending on the vehicle body.

Such an apparatus of supplying a fire extinguishing agent to a high voltage battery of a vehicle according to various exemplary embodiments of the present invention includes, a fire detection device 200 that detects an occurrence of the fire in the battery pack 510, an inflow plug 310 (refer to FIG. 2) that formed at the battery case 500 and allows the fire extinguishing agent to flow into the battery case 500 when the inflow plug is opened, a fire extinguishing agent supply pipe 420 configured to guide the fire extinguishing agent to the inflow plug 310, and an inflow plug opening device 300 that opens the inflow plug 310 when the fire is detected in the fire detection device 200.

A first end portion of the fire extinguishing agent supply pipe 420 is connected to the inflow plug 310 of the battery case 500 to supply the fire extinguishing agent to the battery case 500. Meanwhile, a second end portion of the fire extinguishing agent supply pipe 420 extends toward a windshield 910 of the vehicle. For example, the fire extinguishing agent supply pipe 420 may be connected to a rain gutter 410 formed under the windshield 910 of the vehicle.

The fire extinguishing agent supply pipe 420 is not limited to being formed of a rigid pipe, and may be formed in various configurations, e.g., a rubber hose, which may form a passage to supply the fire extinguishing agent to the battery case 500.

In the exemplary embodiment of the present invention, the fire detection device 200 is configured in a passive fire detection structure which is configured for detecting fire during parking of the vehicle without a controller and separate power source. As an example, the fire detection device 200 may heat a pressure transfer gas by a high temperature gas which is discharged when a fire occurs in the battery pack 510, and the inflow plug opening device 300 may open the inflow plug 310 by use of a pressure of the pressure transfer gas supplied from the fire detection device 200.

As shown in FIG. 2, in an apparatus of supplying a fire extinguishing agent to a high voltage battery of a vehicle according to various exemplary embodiments of the present invention, the fire detection device 200 may include a gas discharge plug 210 which is opened by a pressure of the high temperature gas generated in the battery pack 510 to discharge the high temperature gas from the battery case 500 when the fire occurs in the battery pack 510.

The gas discharge plug 210 is closed in a normal state, blocking the battery case 500 from the outside, and maintaining the battery case 500 in a sealed state. For such a purpose, an elastic spring 215 for maintaining the gas discharge plug 210 in the sealed state may be connected to an upper portion of the gas discharge plug 210.

In an exemplary embodiment of the present invention, the battery case 500 may include an exhaust hole 230 onto which the gas discharge plug 210 is selectively positioned on the exhaust hole 230 according to the pressure of the high temperature gas generated in the battery pack 510.

The fire detection device 200 may further include a high temperature gas discharge pipe 220 which is connected to the gas discharge plug 210 to discharge the high temperature gas discharged through the gas discharge plug 210 to the outside. The high temperature gas discharge pipe 220 may be formed of any material (e.g., metal) having durability in the high temperature gas discharged from the battery pack 510 during fire.

The fire detection device 200 may further include a high temperature gas detection device 250 which is activated by the high temperature gas flowing through the high temperature gas discharge pipe 220.

In more detail, the high temperature gas detection device 250 may include a pressure transfer gas storage 255 mounted on the high temperature gas discharge pipe 220, storing the pressure transfer gas, and heated by the high temperature gas flowing through the high temperature gas discharge pipe 220.

The pressure transfer gas storage 255, for example, may be formed to surround the high temperature gas discharge pipe 220 as shown in the drawings, but is not limited thereto. Various configurations which may receive the heat of the high temperature gas passing through the high temperature gas discharge pipe 220 will be available.

That is, when the high temperature gas is discharged from the battery case 500 through the high temperature gas discharge pipe 220, the heat of the high temperature gas is transferred to the pressure transfer gas storage 255, and the temperature of the pressure transfer gas in the pressure transfer gas storage 255 is increased, increasing an internal pressure of the pressure transfer gas storage 255.

The pressure transfer gas is for transferring the pressure in the pressure transfer gas storage 255 to the inflow plug opening device 300, and an inert gas which is inactive to chemical reaction and/or temperature may be used as the pressure transfer gas. For the example, a noble gas such as Neon (Ne), helium (He), Argon (Ar), krypton (Kr) may be used as the pressure transfer gas, and in a specific example, Argon (Ar) may be used as the pressure transfer gas.

FIG. 2 illustrates that the high temperature gas discharge pipe 220 is provided to penetrate the pressure transfer gas storage 255 in a straight line, however, is not limited thereto. It may be understood that numerous variations are available, such as the high temperature gas discharge pipe 220 penetrating the pressure transfer gas storage 255 along a curved path.

The high temperature gas detection device 250 may further include a pressure transfer pipe 260 connecting the pressure transfer gas storage 255 and the inflow plug 310. That is, the pressure transfer gas storage 255 and the inflow plug opening device 300 are interconnected to each other by the pressure transfer pipe 260.

The high temperature gas detection device 250 may further include a pressure transfer pipe valve 265 mounted on the pressure transfer pipe 260 to selectively transfer pressure through the pressure transfer pipe 260. That is, when the pressure transfer pipe valve 265 is open, the pressure transfer gas storage 255 and the inflow plug opening device 300 fluidically communicates with each other through the pressure transfer pipe 260. Therefore, when the pressure in the pressure transfer gas storage 255 is increased, the present pressure increase is transferred to the inflow plug opening device 300 through the pressure transfer pipe 260. Meanwhile, when the pressure transfer pipe valve 265 is closed, even if the pressure in the pressure transfer gas storage 255 is increased, the present pressure increase is blocked from being transferred to the inflow plug opening device 300 through the pressure transfer pipe 260.

In an exemplary embodiment of the present invention, the pressure transfer pipe valve 265 may be a valve operated by an actuator.

The high temperature gas detection device 250 may further include a controller ECU configured to open or close the pressure transfer pipe valve 265 in which the actuator thereof is electrically connected to the controller, depending on whether the vehicle runs.

The controller ECU may be implemented as at least one microprocessor operable by a predetermined program, and such predetermined program may include a series of instructions for opening or closing the pressure transfer pipe valve 265 depending on whether the vehicle runs.

In more detail, the controller ECU may control the pressure transfer pipe valve 265 to open when the vehicle is not running, i.e., when the vehicle is in stoppage. Furthermore, the controller ECU may control the pressure transfer pipe valve 265 to close when the vehicle is running.

In more detail, the controller ECU may receive vehicle speed information from a vehicle speed sensor of the vehicle, and may determine whether the vehicle is running based on the vehicle speed information. For example, the controller ECU may determine that the vehicle is running when the vehicle speed is not 0, and may determine that the vehicle is not running when the vehicle speed is 0.

In another example, the controller ECU may receive a state of charge (SOC) information from the high voltage battery and may determine whether the vehicle is running based on the SOC information. For example, based on the SOC value of the high voltage battery, the controller ECU may determine that the vehicle is not running when a discharge rate is below a predetermined value, and may determine that the vehicle is running when the discharge rate is above the predetermined value.

The predetermined value may be set to various values according to the designer's intention. For example, when the predetermined value is set to 0, it will be determined that the vehicle is not running when the vehicle is fully stopped and all the power is turned off, and it will be determined that the vehicle is running in the case of a temporary stoppage of the vehicle, e.g., in a state waiting a green signal at a crossroad.

Meanwhile, when the vehicle is running, a discharge rate of the high voltage battery pack 510 is large. Therefore, the controller ECU may determine that the vehicle is running when the discharge rate of the high voltage battery pack 510 exceeds a discharge rate which may be caused by usage of electrical components such as a heater during a stoppage of the vehicle.

In an apparatus of supplying a fire extinguishing agent to a high voltage battery of a vehicle according to various exemplary embodiments of the present invention, the inflow plug opening device 300 may include a bellows tube 320 which is formed between the inflow plug 310 and the battery case 500, connected to the high temperature gas detection device 250, and expands when the high temperature gas detection device 250 is activated.

In more detail, the bellows tube 320 may be connected to the pressure transfer pipe 260 to expand by the internal pressure of the pressure transfer pipe 260.

The inflow plug 310 is closed in the normal state, blocking the battery case 500 from the fire extinguishing agent supply pipe 420, and maintaining the battery case 500 in a sealed state. For such a purpose, an elastic spring 330 for maintaining the inflow plug 310 in the sealed state may be connected to an upper portion of the inflow plug 310. That is, the inflow plug opening device 300 may further include the elastic spring 330 that forms a pressurizing force on the inflow plug 310 from an opposite side to the bellows tube 320 with reference of the inflow plug 310.

A rainwater exhaust line 430 is connected to the fire extinguishing agent supply pipe 420 such that, when the inflow plug 310 is closed, fluid such as rainwater flowing through the fire extinguishing agent supply pipe 420 may be discharged. Therefore, when the inflow plug 310 is closed, the rainwater may be discharged through the rainwater exhaust line 430 even if the rainwater flows through the fire extinguishing agent supply pipe 420 from the rain gutter 410.

Figure 3:
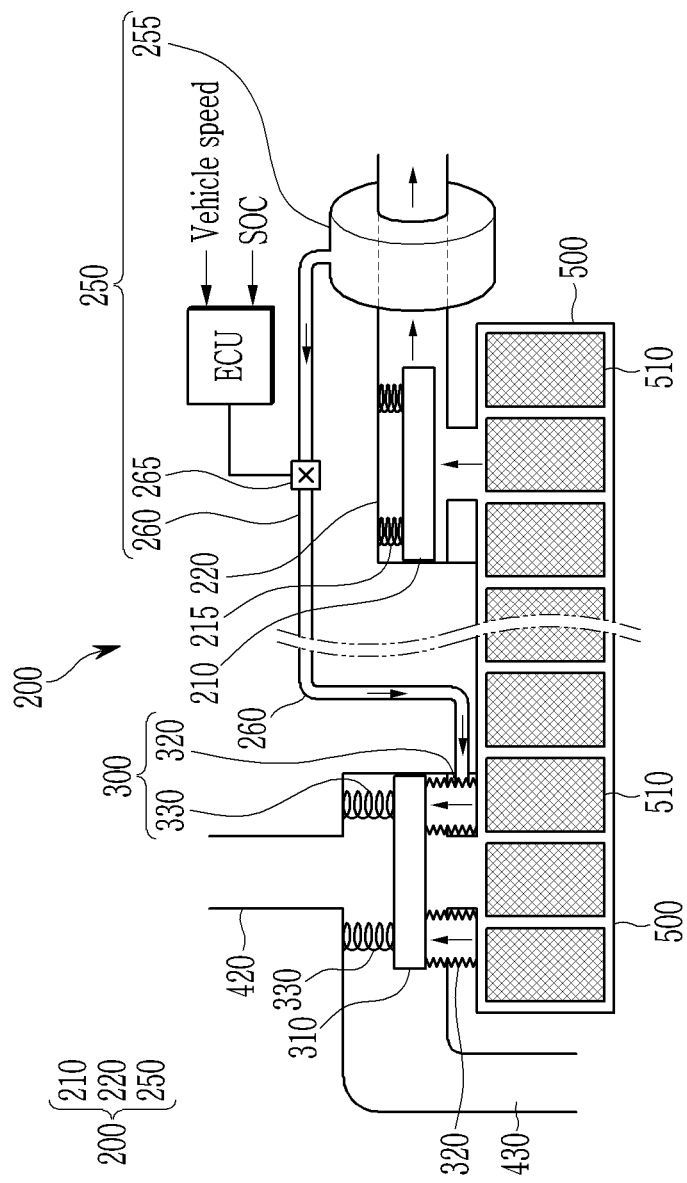
FIG. 3 illustrates an operation of an apparatus of supplying a fire extinguishing agent to a high voltage battery of a vehicle according to various exemplary embodiments of the present invention.

FIG. 3 illustrates an operation of an apparatus of supplying a fire extinguishing agent to a high voltage battery of a vehicle according to various exemplary embodiments of the present invention.

In FIG. 3, the vehicle is running, and the pressure transfer pipe valve 265 on the pressure transfer pipe 260 is opened by the controller ECU.

As shown in FIG. 3, then the high temperature gas is generated by the fire in the battery pack 510, the high temperature gas forms a high pressure in the battery case 500, and a high pressure gas applies an opening pressure to the gas discharge plug 210 of the fire detection device 200. When the opening pressure exceeds the elastic force of the elastic spring 215, the gas discharge plug 210 is opened, and the high temperature gas in the battery case 500 may exit from the battery case 500 through the gas discharge plug 210.

The high temperature gas exiting the gas discharge plug 210 is discharged to the outside through the gas discharge pipe 220, and in the present process, the high temperature gas detection device 250 is activated. That is, while passing through the pressure transfer gas storage 255 mounted on the gas discharge pipe 220, the high temperature gas transfers heat to the pressure transfer gas storage 255, and thereby the pressure in the pressure transfer gas storage 255 is increased.

Since the pressure transfer pipe valve 265 is open, the increased pressure of the pressure transfer gas is transferred to the inflow plug opening device 300, in more detail, to the bellows tube 320, through the pressure transfer pipe 260.

Therefore, the bellows tube 320 may be expanded by overcoming the elastic force of the elastic spring 330 by the increased pressure of the pressure transfer gas, and accordingly, the inflow plug 310 is pushed toward the elastic spring 330, being opened.

In the present state, when an external fireman or the like sprays the fire extinguishing agent toward the vehicle, the fire extinguishing agent flows down along the windshield 910 of the vehicle to be collected in the rain gutter 410, and then flows to the inflow plug 310 through the fire extinguishing agent supply pipe 420. At the instant time, since the inflow plug 310 is open, the fire extinguishing agent sprayed toward the vehicle may naturally flow into the battery case 500.

In an exemplary embodiment of the present invention, the battery case 500 may include an intake hole 440 onto which the inflow plug 310 is selectively positioned on the intake hole 440 according to the pressure of the pressure transfer gas.

Therefore, since the fire extinguishing agent may be smoothly supplied into the battery case 500 where a fire has occurred, the fire may be suppressed more rapidly during a fire of the vehicle having the high voltage battery pack 510.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for supplying a fire extinguishing agent to a battery pack of a vehicle when a fire occurs in a battery case in which the battery pack is mounted, the apparatus comprising:
    a fire detection device that is configured to detect an occurrence of the fire in the battery pack;
    an inflow plug which is formed at the battery case and is configured to allow the fire extinguishing agent to flow into the battery case when the inflow plug is opened;
    a fire extinguishing agent supply pipe connected to the battery case and guiding the fire extinguishing agent to the inflow plug; and
    an inflow plug opening device that is configured to open the inflow plug when the fire is detected in the fire detection device,
    wherein the fire detection device includes:
        a gas discharge plug which is opened by a pressure of a heated gas generated in the battery pack to discharge the heated gas from the battery case when the fire occurs in the battery pack;
        a gas discharge pipe in which the gas discharge plug is mounted to discharge the heated gas discharged through the gas discharge plug; and
        a heated gas detection device which is activated by the heated gas flowing through the gas discharge pipe, and
    wherein the heated gas detection device includes:
        a pressure transfer gas storage mounted on a surface of the gas discharge pipe, storing a pressure transfer gas, and heated by the heated gas flowing through the gas discharge pipe;
        a pressure transfer pipe connecting the pressure transfer gas storage and the inflow plug opening device;
        a pressure transfer pipe valve mounted on the pressure transfer pipe to selectively transfer the pressure of the heated gas through the pressure transfer pipe to the inflow plug; and
        a controller electrically connected to the pressure transfer pipe valve and configured to open or close the pressure transfer pipe valve depending on whether the vehicle runs.

2. The apparatus of claim 1,
    wherein the fire detection device is configured to heat the pressure transfer gas by the heated gas which is discharged from the battery case when the fire occurs in the battery pack; and
    wherein the inflow plug opening device is configured to open the inflow plug by use of a pressure of the pressure transfer gas supplied from the fire detection device.

3. The apparatus of claim 2, wherein the pressure transfer gas is an inert gas which is inactive to chemical reaction.

4. The apparatus of claim 2, wherein the pressure transfer gas is Argon (Ar).

5. The apparatus of claim 2, wherein the pressure transfer gas is neon, helium, argon, or krypton.

6. The apparatus of claim 1,
    wherein the battery case includes a discharge hole,
    wherein an elastic spring elastically biases the gas discharge plug toward the discharge hole of the battery case, and
    wherein the discharge hole is selectively opened by the gas discharge plug according to a pressure of the heated gas applied to a side of the gas discharge plug.

7. The apparatus of claim 1, wherein the controller is configured to control the pressure transfer pipe valve to open when the vehicle is not running.

8. The apparatus of claim 7, wherein whether the vehicle is running is determined according to a vehicle speed.

9. The apparatus of claim 8, wherein the controller is configured to conclude that the vehicle is running when the vehicle speed is equal to or greater than a predetermined vehicle speed.

10. The apparatus of claim 7, wherein whether the vehicle is running is determined according to a discharge rate of the battery pack of the vehicle.

11. The apparatus of claim 10, wherein the controller is configured to conclude that the vehicle is running when the discharge rate of the battery pack of the vehicle is equal to or greater than a predetermined discharge rate.

12. The apparatus of claim 1, wherein the controller is configured to control the pressure transfer pipe valve to close when the vehicle is running.

13. The apparatus of claim 1, wherein the inflow plug opening device includes a bellows tube which is formed between the inflow plug and the battery case, fluidically connected to the heated gas detection device, and configured to expand when the heated gas detection device is activated.

14. The apparatus of claim 1, wherein the inflow plug opening device includes a bellows tube which is formed between the inflow plug and the battery case, fluidically connected to the pressure transfer pipe, and expands by an internal pressure of the pressure transfer pipe.

15. The apparatus of claim 14,
    wherein the batter case includes an inflow hole, and
    wherein the inflow plug opening device further includes an elastic spring that elastically biases the inflow plug toward the inflow hole to the bellows tube.

16. The apparatus of claim 1, wherein an end portion of the fire extinguishing agent supply pipe is connected to a rain gutter formed under a windshield of the vehicle.

* * * * *